US006944775B2

(12) United States Patent
Barton et al.

(10) Patent No.: US 6,944,775 B2
(45) Date of Patent: Sep. 13, 2005

(54) SCANNER API FOR EXECUTING MULTIPLE SCANNING ENGINES

(75) Inventors: Chris A. Barton, Buckingham (GB); Lee Codel Lawson Tarbotton, Avlesbury (GB); Martin J. Lucas, Avlesbury (GB)

(73) Assignee: Networks Associates Technology, Inc., Santa Clara, CA (US)

( * ) Notice: Subject to any disclaimer, the term of this patent is extended or adjusted under 35 U.S.C. 154(b) by 820 days.

(21) Appl. No.: 09/916,610

(22) Filed: Jul. 26, 2001

(65) Prior Publication Data

US 2003/0051154 A1 Mar. 13, 2003

(51) Int. Cl.⁷ .............................. G06F 11/30; H04I 9/00
(52) U.S. Cl. ........................ 713/201; 713/188; 713/200
(58) Field of Search .................................. 713/188–201

(56) References Cited

U.S. PATENT DOCUMENTS

| | | | |
|---|---|---|---|
| 5,696,822 A | 12/1997 | Nachenberg | 380/4 |
| 5,832,208 A | 11/1998 | Chen et al. | 395/187.01 |
| 6,021,510 A | 2/2000 | Nachenberg | 714/38 |
| 6,029,256 A | 2/2000 | Kouznetsov | 714/38 |
| 6,035,423 A | 3/2000 | Hodges et al. | 714/38 |
| 6,088,804 A * | 7/2000 | Hill et al. | 713/201 |
| 6,094,731 A | 7/2000 | Waldin et al. | 714/38 |
| 6,347,375 B1 * | 2/2002 | Reinert et al. | 713/200 |
| 6,578,147 B1 * | 6/2003 | Shanklin et al. | 713/200 |
| 6,728,886 B1 * | 4/2004 | Ji et al. | 713/201 |
| 6,748,534 B1 * | 6/2004 | Gryaznov et al. | 713/188 |
| 2002/0078381 A1 * | 6/2002 | Farley et al. | 713/201 |
| 2002/0194487 A1 * | 12/2002 | Grupe | 713/200 |
| 2003/0110258 A1 * | 6/2003 | Wolff et al. | 709/225 |

OTHER PUBLICATIONS

Network Associates, inc., "Next Generation Intrusion Detection in High–Speed Networks", Network Associates, Inc., 1999, http://www.cc.gatech.edu/classes/AY2004/cs6255_fall/papers/6_ACT_IDS_001.pdf, entire document.*
Lockwood, J., et al, "Internet Worm and Virus Protection in Dynamically Reconfigurable Hardware", Washington University, Applied Reasearch Lab., Sep. 9, 2003, "http://www.arl.wustl.edu/~lockwood/publications/MAPLD_2003_e10_lockwood_p.pdf", entire document.*

* cited by examiner

Primary Examiner—Emmanuel L. Moise
Assistant Examiner—Ronald Baum
(74) Attorney, Agent, or Firm—Zilka-Kotab, PC; Christopher J. Hamaty

(57) ABSTRACT

A system, method and computer program product are provided for scanning data utilizing multiple scanning engines. Initially, a request for data to be scanned for viruses is generated utilizing a scanning interface. Thereafter, such request to scan data is sent to a plurality of scanning engines utilizing an engine interface application control module coupled between the scanning interface and the scanning engines. The request is adapted for prompting the scanning engines to scan the data and respond with events upon locating a virus. Such events are then received utilizing an event processor module coupled to the scanning engines and the engine interface application control module for processing the events. The processed events are then sent to the engine interface application control module for being monitored by the scanning interface.

20 Claims, 6 Drawing Sheets

SCANNER API FOR EXECUTING MULTIPLE SCANNING ENGINES

FIELD OF THE INVENTION

The present invention relates to network security and policy management, and more particularly to malicious code and content scanning methods.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth. Similar damage may be inflicted upon computer workstations, servers, hand-held devices, etc.

Security systems often employ security risk-assessment tools, i.e. "scanners," to simulate an attack against computer systems via a remote connection. Such scanners can probe for network weaknesses by simulating certain types of security events that make up an attack. Such tools can also test user passwords for suitability and security. Moreover, scanners can search for known types of security events in the form of malicious programs such as viruses, worms, and Trojan horses. Still yet, scanners are used for content filtering to enforce an organization's operational policies [i.e. detecting harassing or pornographic content, junk e-mails, misinformation (virus hoaxes), etc.].

Many systems utilize a single scanner that is manufactured by a particular vendor. Conventionally, all scanners are different in terms of their virus signature resources and scanning capabilities. As such, there are often many trade-offs that accompany choosing one particular scanner over another. Moreover, each scanner is incompatible with other scanners. Accordingly, it is unfortunately infeasible to implement more than one scanner in combination for more comprehensive scanning.

DISCLOSURE OF THE INVENTION

A system, method and computer program product are provided for scanning data utilizing multiple scanning engines. Initially, a request for data to be scanned for viruses is generated utilizing a scanning interface. Thereafter, such request to scan data is sent to a plurality of scanning engines utilizing an engine interface application control module coupled between the scanning interface and the scanning engines. The request is adapted for prompting the scanning engines to scan the data and respond with events upon locating a virus. Such events are then received utilizing an event processor module coupled to the scanning engines and the engine interface application control module for processing the events. The processed events are then sent to the engine interface application control module for being monitored by the scanning interface.

In one embodiment, the engine interface application control module, the event processor module and/or any other modules may reside on a gateway. Further, the scanning interface may automatically generate the request in response to the receipt of data at the gateway. As an option, the scanning interface may include a graphical user interface for allowing a user to manually generate the request.

In another embodiment, the engine interface application control module may translate the requests for each of the scanning engines. Further, the event processor module may translate the events from each of the scanning engines into a single format. Such translated events may then be transmitted to the scanning interface for outputting the event.

As an option, the scanning engines may include proprietary scanning engines. Further, the scanning engines may include incompatible scanning engines.

DESCRIPTION OF THE PREFERRED EMBODIMENTS

Figure 1:
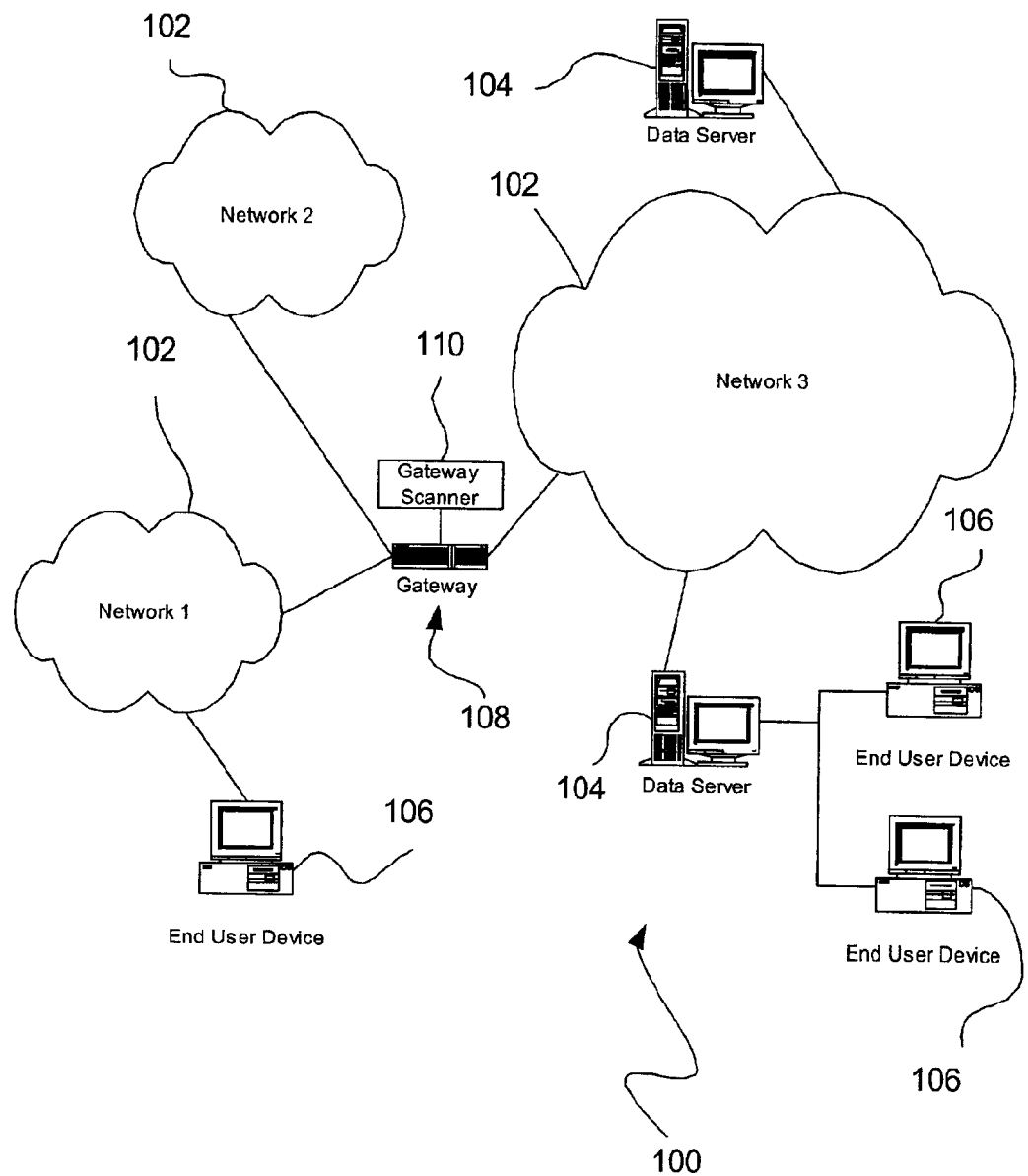
FIG. 1 illustrates a network architecture, in accordance with the one embodiment.

FIG. 1 illustrates a network architecture 100, in accordance with the one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data servers 104 which are capable of communicating over the networks 102. Also coupled to the networks 102 and the data servers 104 is a plurality of end user computers 106. In the context of the present description, such end user computers 106 may include a web server, desktop computer, lap-top computer, hand-held computer, printer or any other type of hardware/software.

In order to facilitate communication among the networks 102, at least one gateway 108 is coupled therebetween. Resident on the gateway 108 is a gateway scanner 110 that serves to scan data being transmitted between the networks 102, data servers 104 and user computers 106. It should be noted that the scanner 110 may be resident on various other intermediate devices such as a proxy server, router, or any device capable of passing data therethrough. Further, the scanner 110 may be incorporated into the data servers 104 and/or user computers 106.

In use, the gateway scanner 110 is capable of scanning data passing therethrough utilizing a plurality of incompatible or proprietary scanning engines. Each of such scanning engines is adapted to scan the data for viruses using a unique set of procedures, resources, etc. In the context of the present description, the term virus may refer to any malicious code, hostile content or any other unwanted entity.

Figure 2:
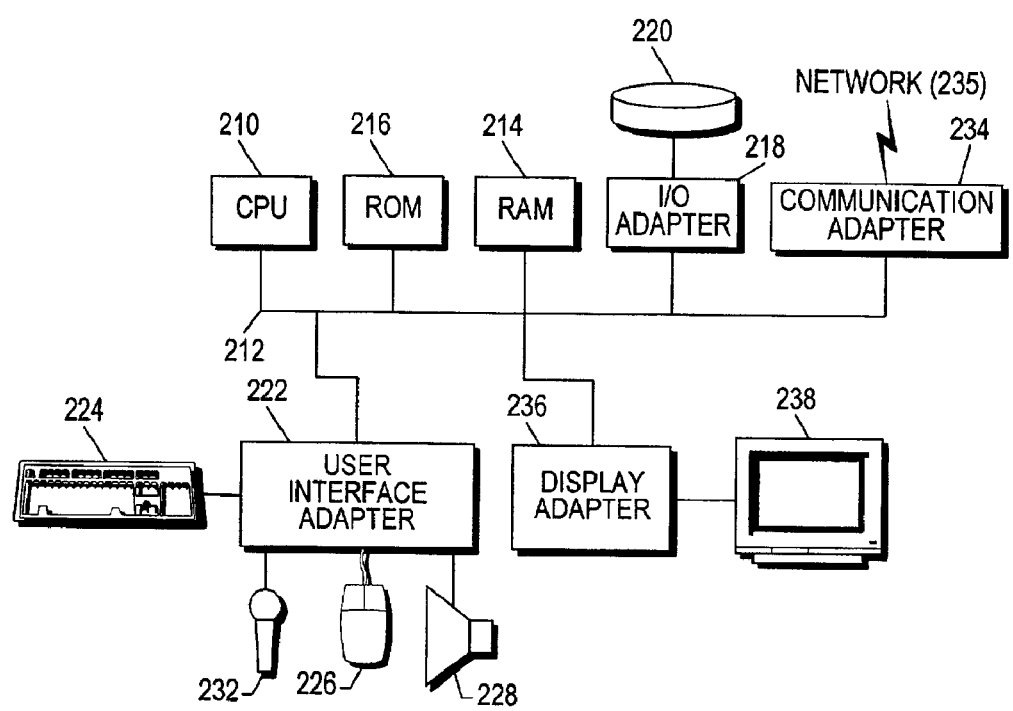
FIG. 2 shows a representative hardware environment that may be associated with the data servers and/or end user computers of FIG. 1, in accordance with one embodiment.

FIG. 2 shows a representative hardware environment that may be associated with the data servers 104 and/or end user computers 106 of FIG. 1, in accordance with one embodiment. Such figure illustrates a typical hardware configuration in accordance with a preferred embodiment having a central processing unit 210, such as a microprocessor, and a number of other units interconnected via a system bus 212.

The present hardware shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the present hardware to a communication network 235 (e.g., a data processing network) and a display adapter 236 for connecting the bus 212 to a display device 238. It should be noted that the present hardware is set forth for illustrative purposes only, and should not be construed as limiting in any manner.

The present hardware may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
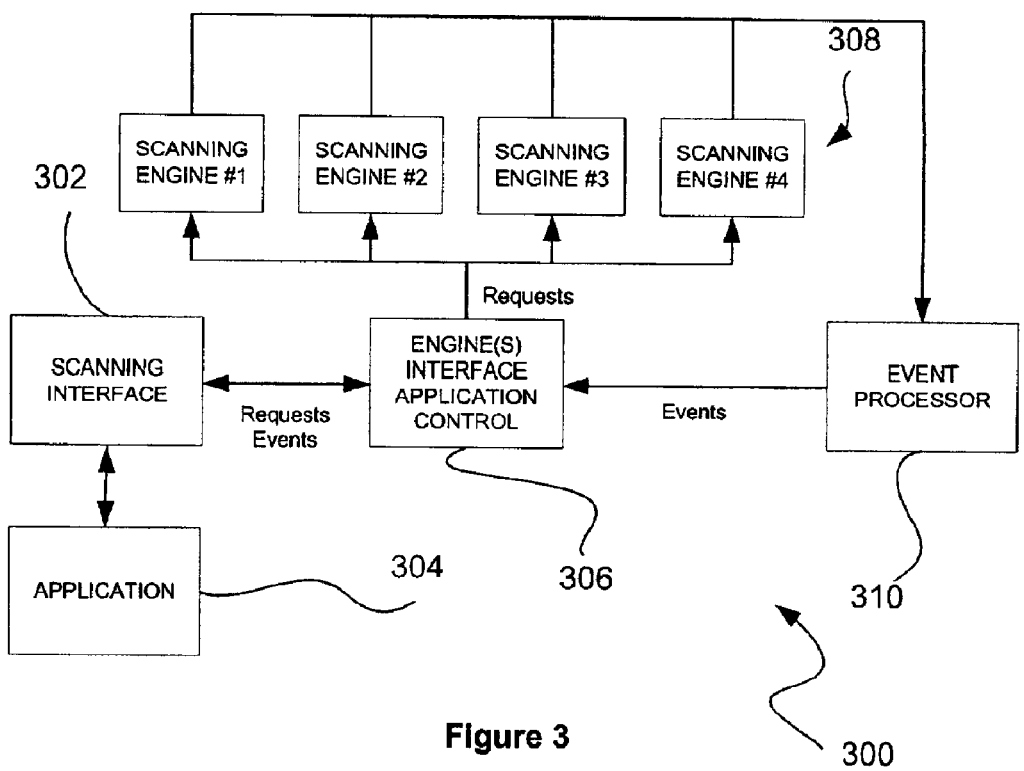
FIG. 3 shows a scanner framework associated with the scanner of FIG. 1, in accordance with one embodiment.

FIG. 3 shows a scanner framework 300 associated with the scanner 110 of FIG. 1, in accordance with one embodiment. As shown, a scanning interface 302 is coupled to an application 304. In one embodiment, the application 304 monitors and manages the operation of the gateway 108, or any other device on which the scanner 110 is installed.

In use, the application 304 is capable of providing the scanning interface 302 with an indication that data is received at the gateway 108 or any other situation that may warrant a scanning procedure. In response to such indication, the scanning interface 302 is adapted for generating a request for the data to be scanned for viruses, malicious code and/or unwanted content. In one embodiment, the scanning interface 302 may automatically generate the request in response to the indication at the gateway 108. As an option, the scanning interface 302 or any other component of the present embodiment may include a graphical user interface for allowing a user to manually generating the request.

Also included is an engine interface application control module 306 coupled between the scanning interface 302 and a plurality of scanning engines 308. The scanning engines 308 are each adapted to scan the data for viruses using a unique set of procedures, resources, etc. in response to an appropriate request. In use, the engine interface application control module 306 is adapted to translate any request received from the scanning interface 302, and transmit the same to the scanning engines 308. The translated requests are adapted for prompting the scanning engines 308 to scan the data and respond with events. In the context of the present description, an event may be the identification of unwanted content (i.e. pornography, banned phrases, etc.), viruses, malicious code, etc.

With continuing reference to FIG. 3, an event processor module 310 is coupled to the scanning engines 308 and the engine interface application control module 306 for receiving the events from the scanning engines 308. Similar to the requests, the events of each of the scanning engines 308 include a unique format. The event processor module 310 serves to translate the events and send the same to the engine interface application control module 306. The engine interface application control module 306 is, in turn, adapted to forward the translated events to the scanning interface 302 and the application 304 so that appropriate action may be taken. For example, the data may be deleted, repaired and/or quarantined. In the alternative, a notification may be sent to a user or network administrator, etc.

Figure 4:
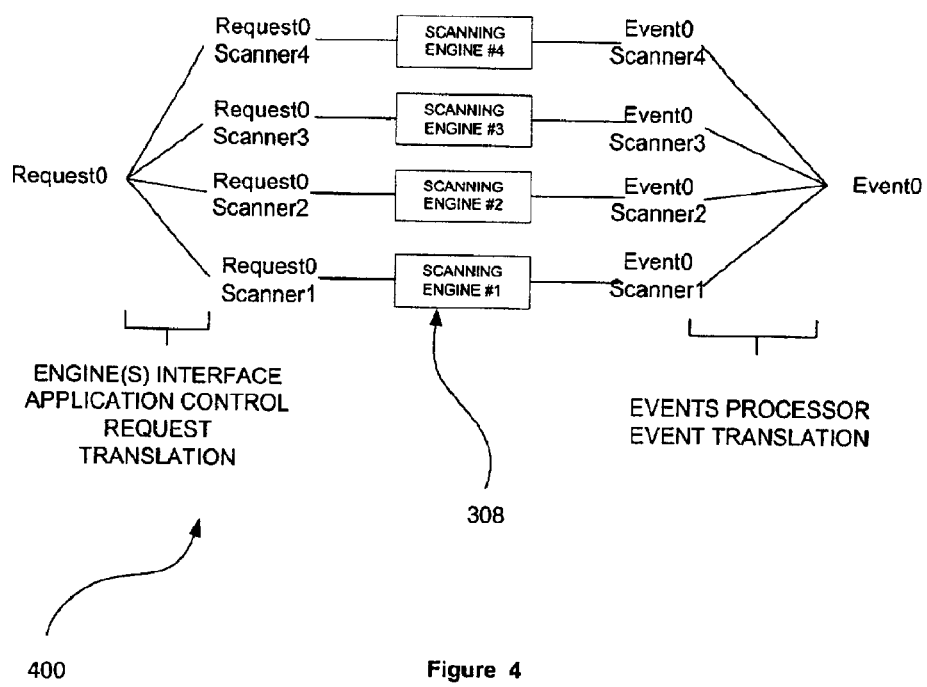
FIG. 4 illustrates the manner in which the engine interface application control module and the event processor module translate the requests and the events, respectively, in accordance with one embodiment.

FIG. 4 illustrates the manner 400 in which the engine interface application control module 306 and the event processor module 310 translate the requests and the events, respectively, in accordance with one embodiment. The engine interface application control module 306 includes a request look up table (See Table 1) for correlating requests received from the scanning interface 302, and the requests of each of the scanning engines 308. In a similar manner, the event processor module 310 includes an event look up table (See Table 2) for correlating events received from the scanning engines 308, and the events capable of being received by the engine interface application control module 306 and the scanning interface 302.

TABLE 1

Request0

Request $0_{Scanner1}$
Request $0_{Scanner2}$
Request $0_{Scanner3}$
Request $0_{Scanner4}$
Request $0_{Scannerx}$
Request1

Request $1_{Scanner1}$
Request $1_{Scanner2}$
Request $1_{Scanner3}$
Request $1_{Scanner4}$
Request $1_{Scannerx}$

TABLE 2

Event0

Event $0_{Scanner1}$
Event $0_{Scanner2}$
Event $0_{Scanner3}$
Event $0_{Scanner4}$
Event $0_{Scannerx}$
Event1

Event $1_{Scanner1}$
Event $1_{Scanner2}$
Event $1_{Scanner3}$
Event $1_{Scanner4}$
Event $1_{Scannerx}$ It should be noted that the look up tables of Tables 1 and 2 may be updated per the desires of the user. Further, the tables may be logic or rule-based, from a simple table translation to complicated algorithmic data interpolation.

Figure 5:
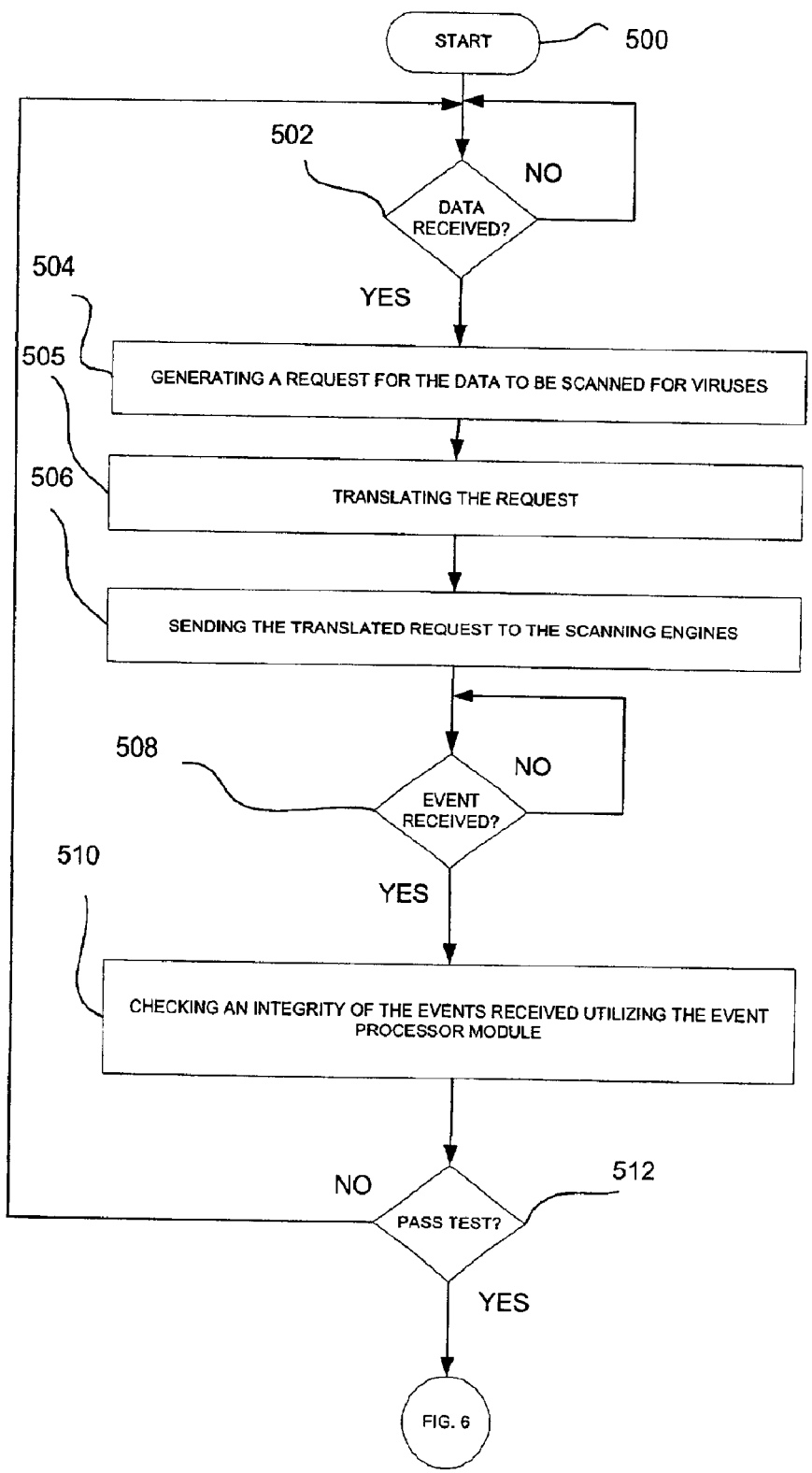
FIGS. 5 and 6 illustrate a method for scanning data utilizing multiple scanning engines utilizing the framework of FIG. 3.
Figure 6:
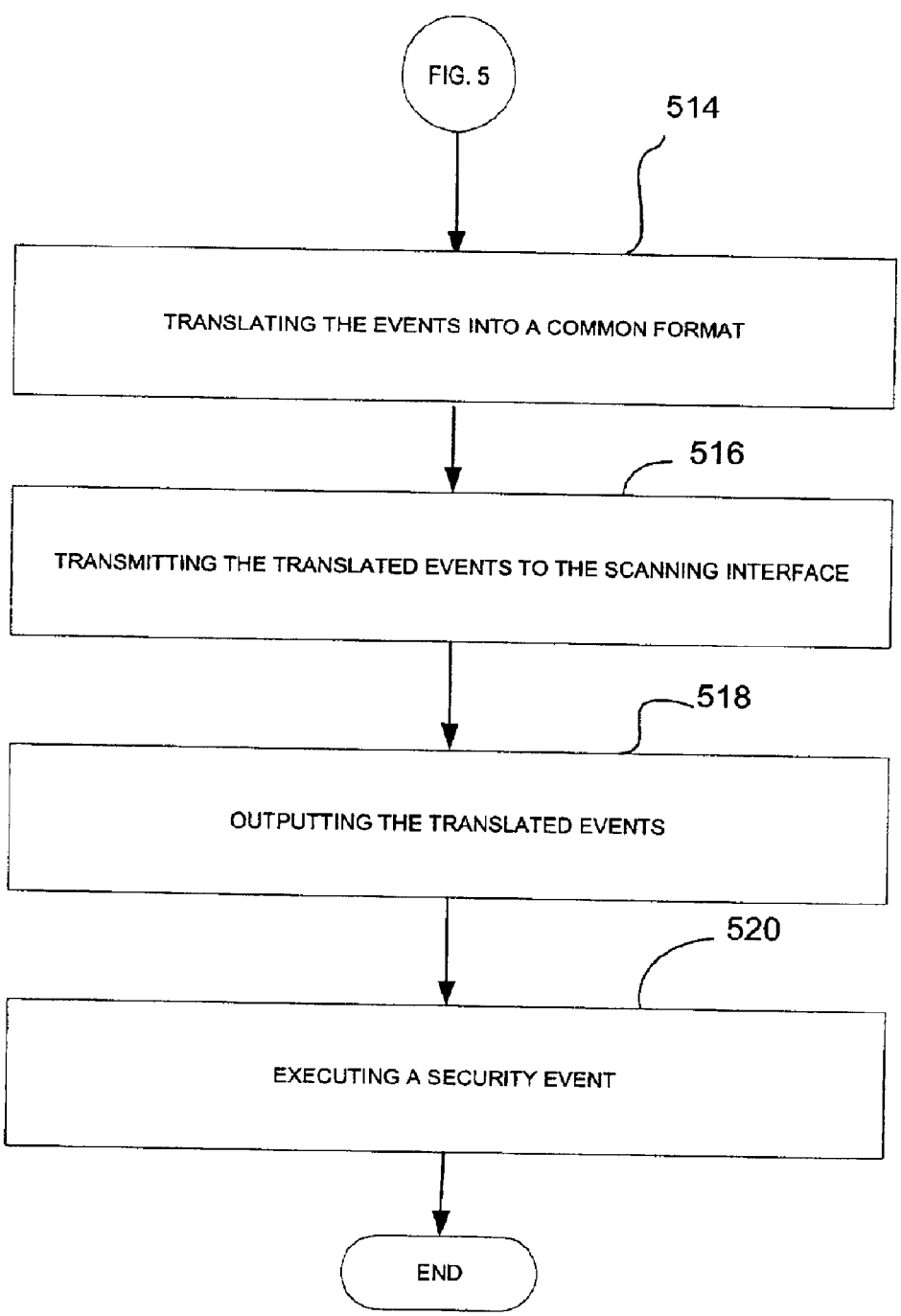

FIGS. 5 and 6 illustrate a method 500 for scanning data utilizing multiple scanning engines 308 utilizing the framework 300 of FIG. 3. Initially, in decision 502, it is determined by the application 304 whether data is received at the gateway 108 or any other event occurs. As shown, the present embodiment is capable of polling until such an event occurs. If the situation warrants a virus scan, the scanning interface 302 serves to generate a request for data to be scanned for viruses. Note operation 504.

Next, in operation 505, the request is translated utilizing the engine interface application control module 306. In the context of the example of FIG. 4, a request, Request0, may be received which is used to look up each request: $Request0_{scanner1}$, $Request0_{scanner2}$, $Request0_{scanner3}$, and $Request0_{scanner4}$; corresponding to the scanning engines 308 using the appropriate look up table (See Table 1). Again, the tables may be logic or rule-based, from a simple table translation to complicated algorithmic data interpolation.

The request may only be applicable to certain scanning engines 308, in which case the engine interface application control module 306 only translates the appropriate requests. This may be accomplished by only including the applicable requests in the look up tables. It should be noted that requests are only applicable when they initiate functionality and/or exploit resources supported by a particular scanning engine 308.

As mentioned earlier, the requests are adapted for prompting the scanning engines 308 to scan the data and respond with events upon locating a virus. Once the translated requests are sent in operation 506, the present embodiment then polls while waiting for results of the scanning from the scanning engines 308. See decision 508. Once an event is received, an integrity of the event is checked in operation 510. In particular, it may be determined whether the event is a fraudulent event sent by a hacker. This may be accomplished by utilizing special codes, encryption, or the like. It should be noted that such "check" is a mere option.

Once it is determined that the event is legitimate in decision 512, the events are translated into a common format utilizing the event processor module 310. Note operation 514. In the context of the example of FIG. 4, an event: $Event0_{scanner1}$, $Event0_{scanner2}$, $Event0_{scanner3}$, and/or $Event0_{scanner4}$; may be received which is used to look up a single format event, Event0, using the appropriate look up table (See Table 2). Similar to the requests, the event may only be applicable to certain scanning engines 308, in which case the event processor module 310 only translates the appropriate events.

The translated events may then be sent to the engine interface application control module 306 and then forwarded to the scanning interface 302. See operation 516. This enables the scanning interface 302 and/or the application 304 to manage or utilize the events as desired to react to any virus. This may be accomplished by simply outputting the events in operation 518 or executing a security event in operation 520. For example, the security event may include alerts, repair routines, quarantine actions, and/or delete operations.

The present embodiment thus integrates many engines into a single product with minimal effort. Accordingly, it is thus feasible to implement more than one scanning engine in combination for more comprehensive scanning.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for scanning data utilizing multiple scanning engines, comprising:
    (a) generating a request for data to be scanned for viruses utilizing a scanning interface;
    (b) sending the request to scan data to a plurality of scanning engines utilizing an engine interface application control module coupled between the scanning interface and the scanning engines, the request being adapted for prompting the scanning engines to scan the data and respond with events upon locating a virus;
    (c) receiving the events utilizing an event processor module coupled to the scanning engines and the engine interface application control module for processing the events; and
    (d) transmitting the processed events to the engine interface application control module for being monitored by the scanning interface;
    wherein the engine interface application control module translates the requests and events for each of the scanning engines;
    wherein the scanning engines are unique proprietary scanning engines each associated with a different vendor;
    wherein the requests and events for each of the scanning engines are in a format different from formats of the other scanning engines;
    wherein the scanning engines are incompatible scanning engines;
    wherein different proprietary scanning engines are combined into a single product.

2. The method as recited in claim 1, wherein the engine interface application control module and the event processor module reside on a gateway.

3. The method as recited in claim 2, wherein the scanning interface automatically generates the request in response to the receipt of data at the gateway.

4. The method as recited in claim 1, wherein the scanning interface includes a graphical user interface for allowing a user to manually generate the request.

5. The method as recited in claim 1, wherein the event processor module translates the events from each of the scanning engines into a single format.

6. The method as recited in claim 5, wherein the translated events are transmitted to the scanning interface for outputting the event.

7. A computer program product for scanning data utilizing multiple scanning engines, comprising:
    (a) computer code for generating a request for data to be scanned for viruses utilizing a scanning interface;
    (b) computer code for sending the request to scan data to a plurality of scanning engines utilizing an engine interface application control module coupled between the scanning interface and the scanning engines, the request being adapted for prompting the scanning engines to scan the data and respond with events upon locating a virus;
    (c) computer code for receiving the events utilizing an event processor module coupled to the scanning engines and the engine interface application control module for processing the events; and
    (d) computer code for transmitting the processed events to the engine interface application control module for being monitored by the scanning interface;

wherein the engine interface application control module translates the requests and events for each of the scanning engines;

wherein the scanning engines are unique proprietary scanning engines each associated with a different vendor;

wherein the requests and events for each of the scanning engines are in a format different from formats of the other scanning engines;

wherein the scanning engines are incompatible scanning engines;

wherein different proprietary scanning engines are combined into a single product.

8. The computer program product as recited in claim 7, wherein the engine interface application control module and the event processor module reside on a gateway.

9. The computer program product as recite in claim 8, wherein the scanning interface automatically generates the request in response to the receipt of data at the gateway.

10. The computer program product as recited in claim 7, wherein the scanning interface includes a graphical user interface for allowing a user to manually generate tho request.

11. The computer program product as recited in claim 7, wherein the event processor module translates the events from each of the scanning engines into a single format.

12. The computer program product as recited in claim 11, wherein the translated events are transmitted to the scanning interface for outputting the event.

13. The computer program product as recited in claim 7, wherein the events include the identification of at least one of unwanted content, viruses and malicious code.

14. A system for scanning data utilizing multiple scanning engines, comprising:
(a) a scanning interface for generating a request for data to be scanned for viruses;
(b) an engine interface application control module coupled between the scanning interface and a plurality of scanning engines for sending the request to scan data to the scanning engines, the request being adapted for prompting the scanning engines to scan the data and respond with events upon locating a virus; and
(c) an event processor module coupled to the scanning engines and the engine interface application control module for receiving the events and processing the events;

wherein the processed events are outputted by the scanning interface;

wherein the engine interface application control module translates the requests and events for each of the scanning engines;

wherein the scanning engines are unique proprietary scanning engines each associated with a different vendor;

wherein the requests and events for each of the scanning engines are in a format different from formats of the other scanning engines;

wherein the scanning engines are incompatible scanning engines;

wherein different proprietary scanning engines are combined into a single product.

15. A method for scanning data utilizing multiple scanning engines, comprising:
(a) means for generating a request for data to be scanned for viruses,
(b) means for sending the request to scan data to the scanning engines, the requests being adapted for prompting the scanning engines to scan the data and respond with events upon locating a virus; and
(c) means for receiving the events and processing the events;

wherein the engine interface application control module translates the requests and events for each of the scanning engines;

wherein the scanning engines are unique proprietary scanning engines each associated with a different vendor;

wherein the requests and events for each of the scanning engines are in a format different from formats of the other scanning engines;

wherein the scanning engines are incompatible scanning engines;

wherein different proprietary scanning engines are combined into a single product.

16. A method for scanning data utilizing multiple scanning engines, comprising:
(a) receiving data at a gateway;
(b) generating a request for the data to be scanned for viruses in response to the receipt of data at the gateway utilizing a scanning interface;
(c) translating the request utilizing an engine interface application control module coupled between the scanning interface and a plurality of scanning engines;
(d) sending the translated request to the scanning engines utilizing the engine interface application control module, the request being adapted for prompting the scanning engines to scan the data and respond with events upon locating a virus;
(e) receiving the events utilizing an event processor module coupled to the scanning engines and the engine interface application control module;
(f) checking an integrity of the events received utilizing the event processor module;
(g) translating the events into a common format utilizing the event processor module if the events pass the integrity check engines; and
(i) outputting the translated events utilizing the scanning interface;

wherein the engine interface application control module translates the requests and events for each of the scanning engines;

wherein the scanning engines are unique proprietary scanning engines each associated with a different vendor;

wherein the requests and events for each of the scanning engines are in a format different from formats of the other scanning engines;

wherein the scanning engines are incompatible scanning engines;

wherein different proprietary scanning engines are combined into a single product.

17. A method for scanning data utilizing a system capable of interfacing multiple scanning engines, comprising: identifying a request from a user for data to be scanned for viruses utilizing an interface;

translating the request to be utilized by at least one of a plurality of different scanning engines;

sending the translated request to the at least one of the scanning engines, the request being adapted for prompting the at least one scanning engine to scan the data and respond with events upon locating a virus;

receiving the events from the at least one scanning engine;

translating the events into a common format;

outputting the translated events utilizing the interface;

wherein the interface translates the requests and events for each of the scanning engines;

wherein the scanning engines are unique proprietary scanning engines each associated with a different vendor;

wherein the requests and events for each of the scanning engines are in a format different from formats of the other scanning engines;

wherein the scanning engines are incompatible scanning engines;

wherein different proprietary scanning engines are combined into a single product.

18. A computer program product for scanning data utilizing a system capable of interfacing multiple scanning engines, comprising:

computer code for identifying a request from a user for data to be scanned for viruses utilizing an interface;

computer code for translating the request to be utilized by at least one of a plurality of different scanning engines;

computer code for sending the translated request to the at least one of the scanning engines, the request being adapted for prompting the at least one scanning engine to scan the data and respond with events upon locating a virus;

computer code for receiving the events from the at least one scanning engine;

computer code for translating the events into a common format; and computer code for outputting the translated events utilizing the interface;

wherein the interface translates the requests and events for each of the scanning engines;

wherein the scanning engines are unique proprietary scanning engines each associated with a different vendor;

wherein the requests and events for each of the scanning engines are in a format different from formats of the other scanning engines;

wherein the scanning engines are incompatible scanning engines;

wherein different proprietary scanning engines are combined into a single product.

19. The method as recited in claim 1, wherein the translation involves a table translation.

20. The method as recited in claim 1, wherein the translation involves an algorithmic data interpolation.

* * * * *

UNITED STATES PATENT AND TRADEMARK OFFICE
CERTIFICATE OF CORRECTION

PATENT NO. : 6,944,775 B2 Page 1 of 1
APPLICATION NO. : 09/916610
DATED : September 13, 2005
INVENTOR(S) : Barton et al.

It is certified that error appears in the above-identified patent and that said Letters Patent is hereby corrected as shown below:

col. 6, line 60 replace "virus," with --virus;--;
    col. 7, line 17 replace "recite" with --recited--;
    col. 7, line 22 replace "tho" with --the--;
    col. 7, line 65 replace "viruses," with --viruses;--;
    col. 8, line 42 replace "(i)" with --(h)--.

Signed and Sealed this

Ninth Day of February, 2010

David J. Kappos
*Director of the United States Patent and Trademark Office*